May 17, 1966 H. UNRUH 3,251,348
ROTARY PISTON ENGINE
Filed Sept. 7, 1962 9 Sheets-Sheet 1

INVENTOR.
Hubert Unruh

May 17, 1966           H. UNRUH           3,251,348

ROTARY PISTON ENGINE

Filed Sept. 7, 1962           9 Sheets-Sheet 2

INVENTOR.
Hubert Unruh
by

INVENTOR.
Hubert Unruh
BY

May 17, 1966  H. UNRUH  3,251,348
ROTARY PISTON ENGINE
Filed Sept. 7, 1962  9 Sheets-Sheet 6

INVENTOR.
Hubert Unruh
BY

United States Patent Office 3,251,348
Patented May 17, 1966

3,251,348
ROTARY PISTON ENGINE
Hubert Unruh, Stettiner Strasse 19, Grevenbroich-Orken, Germany
Filed Sept. 7, 1962, Ser. No. 222,772
Claims priority, application Germany, Sept. 13, 1961,
U 8,329
4 Claims. (Cl. 123—14)

This invention relates to internal combustion engines and particularly to rotary piston engines. More particularly still, this invention relates to a rotary piston engine adapted for use with either spark plug initiated ignitions or with compression ignitions.

Rotary piston engines are known, but heretofore have been extremely complex and expensive and so far as is known to me, there are no commercially successful rotary piston engines which can be manufactured economically.

The particular object of the present invention is the provision of a rotary piston engine which is simple in working principle and in construction and which is, therefore, economcal to manufacture.

In brief, the present invention involves a rotary piston engine having a precombustion chamber. Vanes are employed for dividing the space between the rotary piston and the housing in which it rotates into separate chambers. The piston is provided with cam portions thereon which do the work of conventional pistons in conventional engines.

These cam portions take care of the intake and exhaust of gases and serve as areas that are driven by the expanded ignited mixture.

The aforementioned cam portions of the rotary piston are variable so that the possibility exists of varying the expansion volume to the intake volume to greater than one by the design of the cam portions and the location of the blocking vanes.

A feature of the present invention is the construction of the sliding vanes as a plurality of plate-like elements to obtain a labyrinth effect seal against the piston. Further, these vanes are substantially constant pressure vanes and are operated by cams fixed to the piston so that they always bear against the piston with substantially the same pressure.

The housing surrounding the piston can be provided with as many combustion chambers as desired and can be fitted with a carburetor or with an injection pump so that the rotary piston engine will operate either as a conventional gasoline engine or as a conventional diesel engine at least with respect to the nature of the fuel supply.

Each time a cam portion passes through a combustion chamber, ignition occurs so that with a rotary piston engine having, for example, three combustion chambers and four piston cams, there would be twelve ignitions per revolution of the piston. With two combustion chambers and three piston cams, there would be six explosions per revolution. This can be varied within broad limits.

In connection with the multiple explosions for each revolution of the piston, the angle between the piston cams on the piston and the angle between the combustion chambers on the housing is selected so that the explosions occur consecutively thus obtaining a smooth running engine. The number of combustion chambers, depending on the size of the engine, will be one or two less than the number of cams on the piston.

The exact nature of the present invention will be more clearly understood upon reference to the following specification taken in connection with the accompanying drawings, in which.

Figure 1:
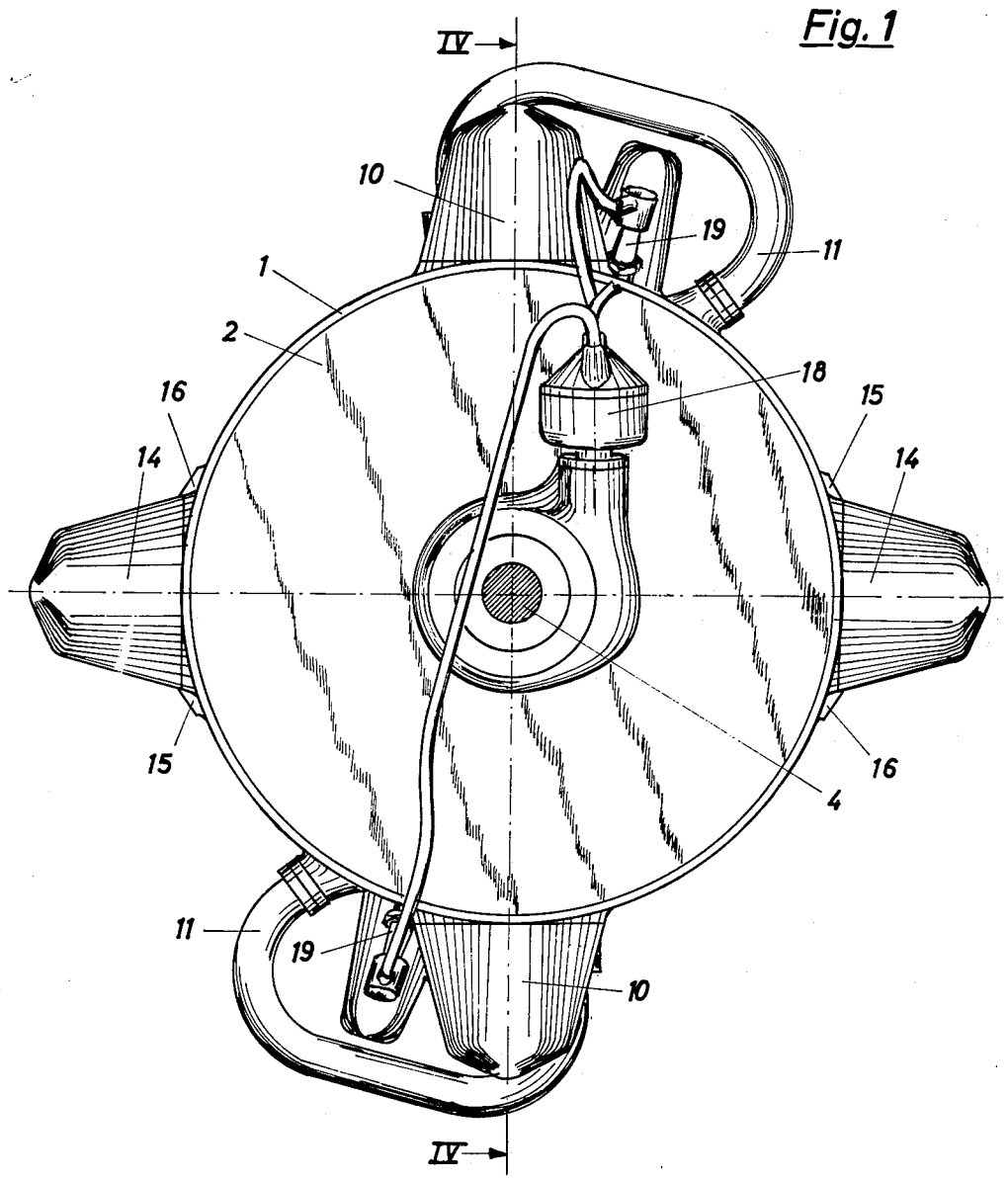
FIGURE 1 is an elevational view of the front side of the rotary piston engine.
Figure 2:
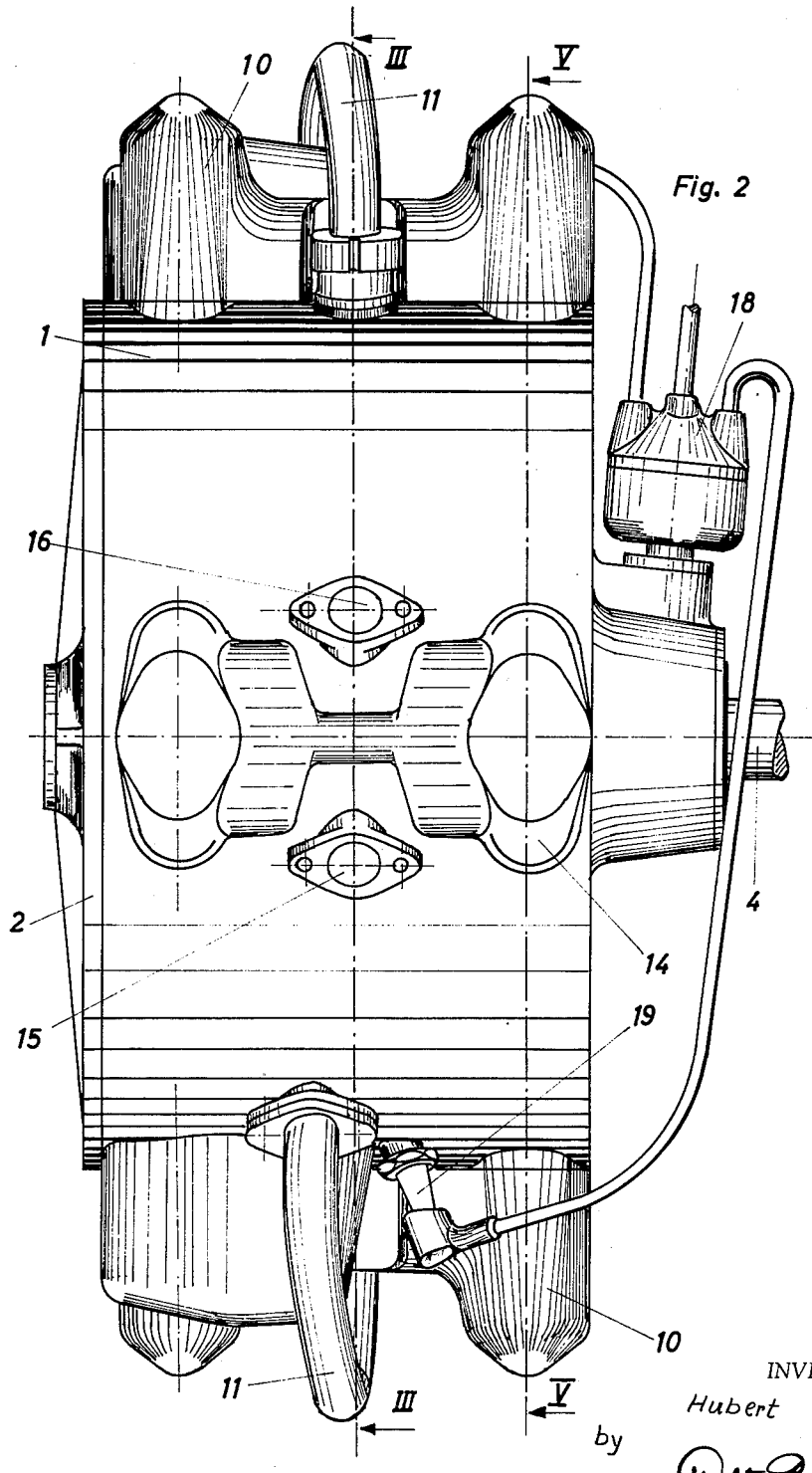
FIGURE 2 is an elevational view looking in from the left side of FIGURE 1.

Referring to the drawings somewhat more in detail, the engine will be seen to consist of a housing 1 having end covers 2. The housing defines a generally cylindrical cavity in which rotary piston 3 is mounted and which piston is fixed to shaft 4. The piston comprises cam portions 5 cast integrally therewith. Fixed to shaft 4 are two valve actuating contour discs or cams 6 and still another valve actuating cam or contour disc 7. More specifically, the periphery of piston 3 is provided with circumferentially spaced circumferentially extending recesses having axial edges 3a located inwardly of the axial edges 3b of piston 3. The recesses at their leading and trailing edges 3c and 3d respectively form the inclines for the cam portions 5 while the portions of the piston 3 between successive recesses form the high parts of the cam portions 5.

The inside of housing 1 is formed with circumferentially spaced recesses 8 forming combustion chambers. Associated with each combustion chamber is a fuel inlet valve 9 adapted when opened to connect the valve with a conduit or transfer passage 11. Transfer passage 11 leads to a combustion chamber vane arrangement generally indicated by reference numeral 10.

Angularly spaced from combustion chamber vane 10 is a blocking vane generally designated by reference numeral 14.

The aforementioned vanes alternate about the housing 1.

All of the vanes are designed as constant pressure vanes so that they always engage the surface of the piston with about the same pressure.

In construction, each vane arrangement includes a push rod 20 having a roller at its inner end engaging the pertaining one of valve actuating cams 6. Push rods 20 are guided in housing 1 and have reduced diameter end parts 20a sliding through stationary brackets 20b that are attached to the housing. Another shoulder at 20c on each push rod engages an arm 20d pertaining to the particular valve to be actuated.

A cup 20e engages the shoulder 20f at the base of portion 20a and forms a bearing for spring 21 that acts between bracket 20b and the said cup and urges the push rod toward the valve actuating cam.

Another spring 22 bears between the inside of the cup and the upper side of arm 20d and acts as a vane biasing spring.

The vanes themselves consist of the individual plates or lamellae 23 and the center one is attached to arm 20d. The two outer lamellae of the vane are connected with the center lamellae by the spring means 23a so that the individual parts of the vane can move radially relative to each other. This action will be seen in FIGURE 3 at the left side where the vane is shown conforming to the contour of the piston.

Figure 3:
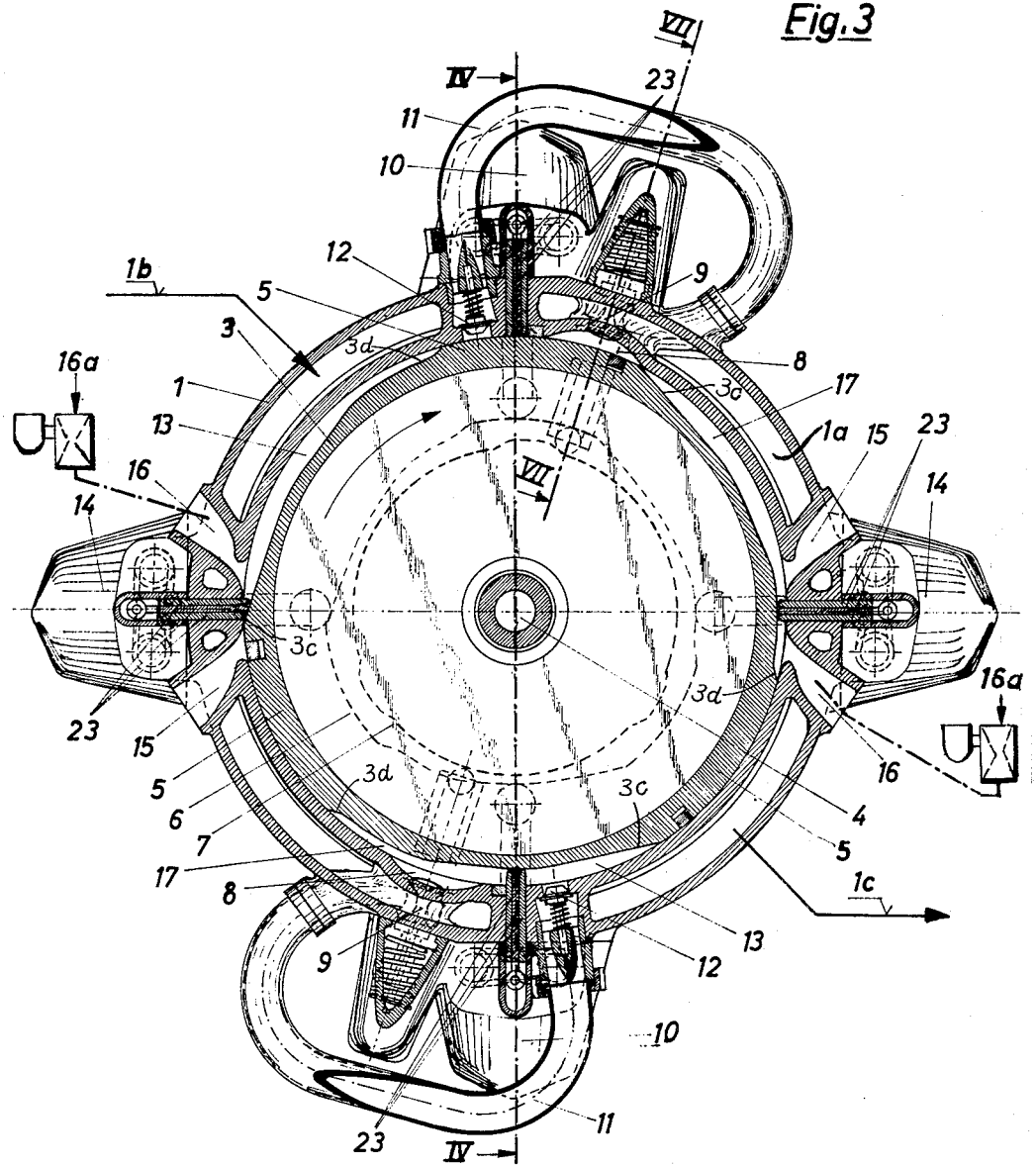
FIGURE 3 is a vertical section through the engine indicated by line III—III on FIGURE 2.

The rotary piston in FIGURE 3 rotates clockwise and the space to the left of the cam portion 5, at the top of the piston, for example, is a compression space and this space is adapted to communicate with transfer passage 11 via spring loaded check valve 12 adjacent the combustion chamber.

The opposite end of transfer passage 11 communicates with intake opening 16 to which a carburetor can be connected as is diagramamtically illustrated at 16a in FIGURE 3. For diesel operation, no such carburetor is employed.

On the other side of the combustion vane, the combustion chamber 8 is adapted for communication with expansion space 17 which, in its right end, communicates with exhaust passage 15 to which an exhaust pipe can be connected.

Figure 4:
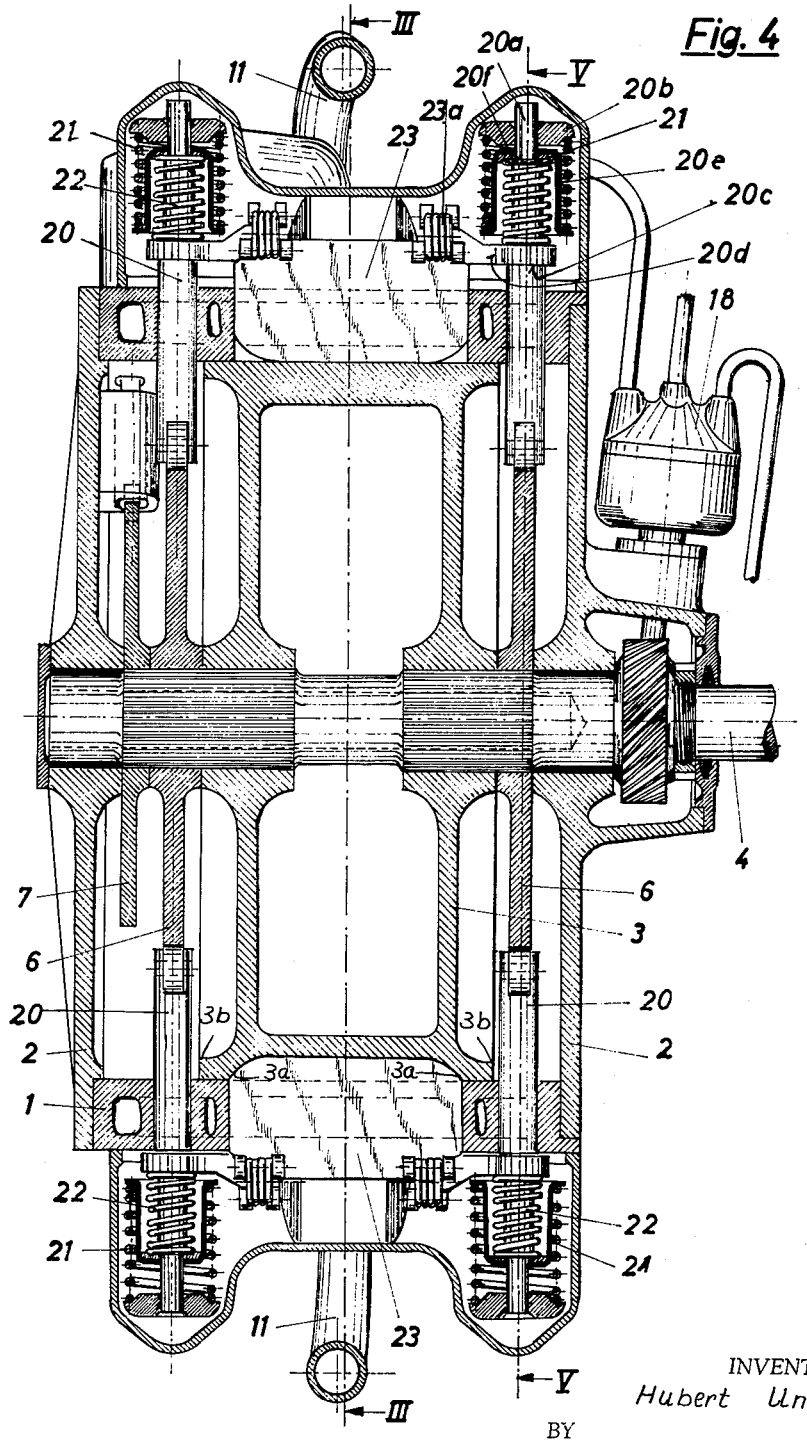
FIGURE 4 is a section through the engine indicated by line IV—IV on FIGURE 1.
Figure 5:
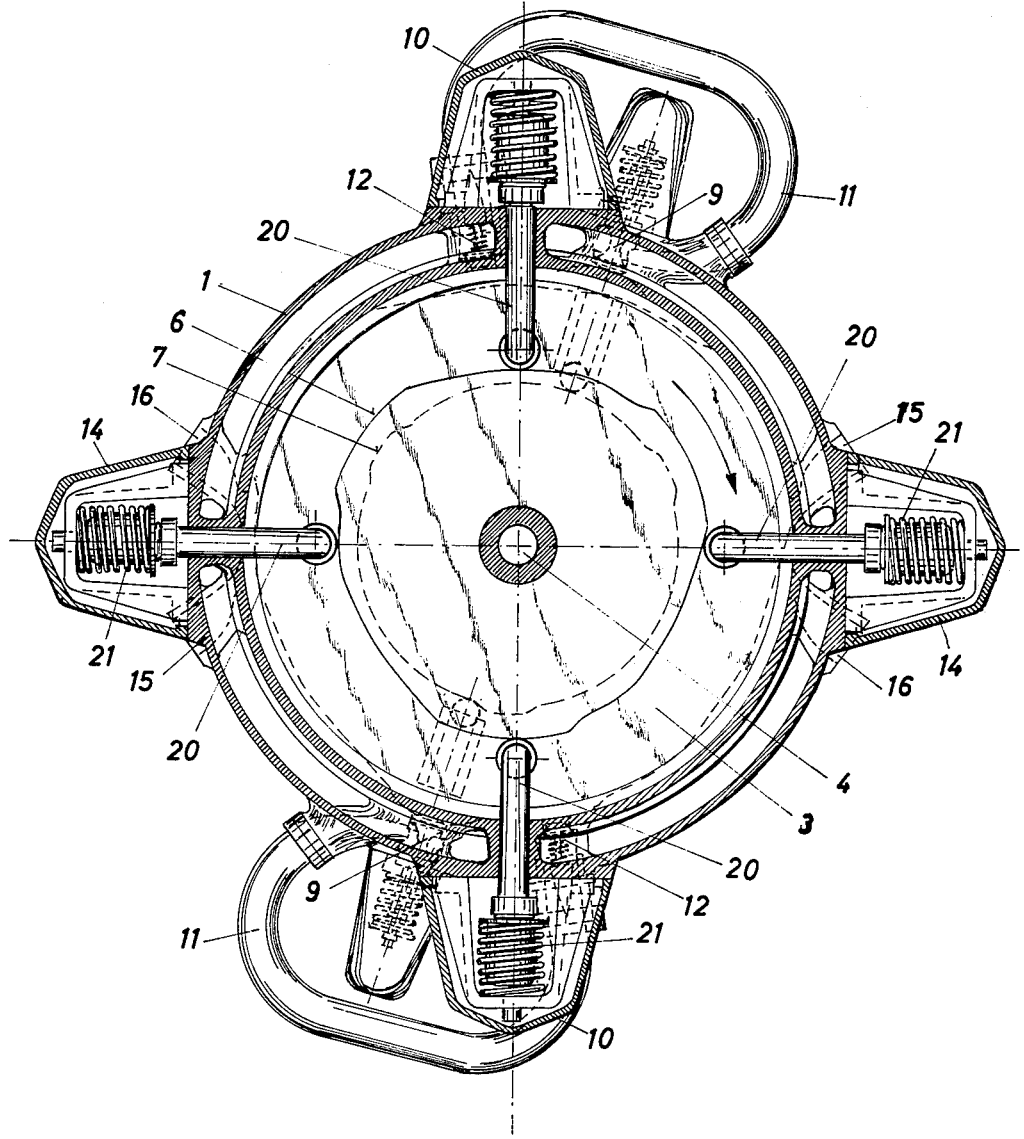
FIGURE 5 is another section indicated by line V—V on FIGURE 2.
Figure 7:
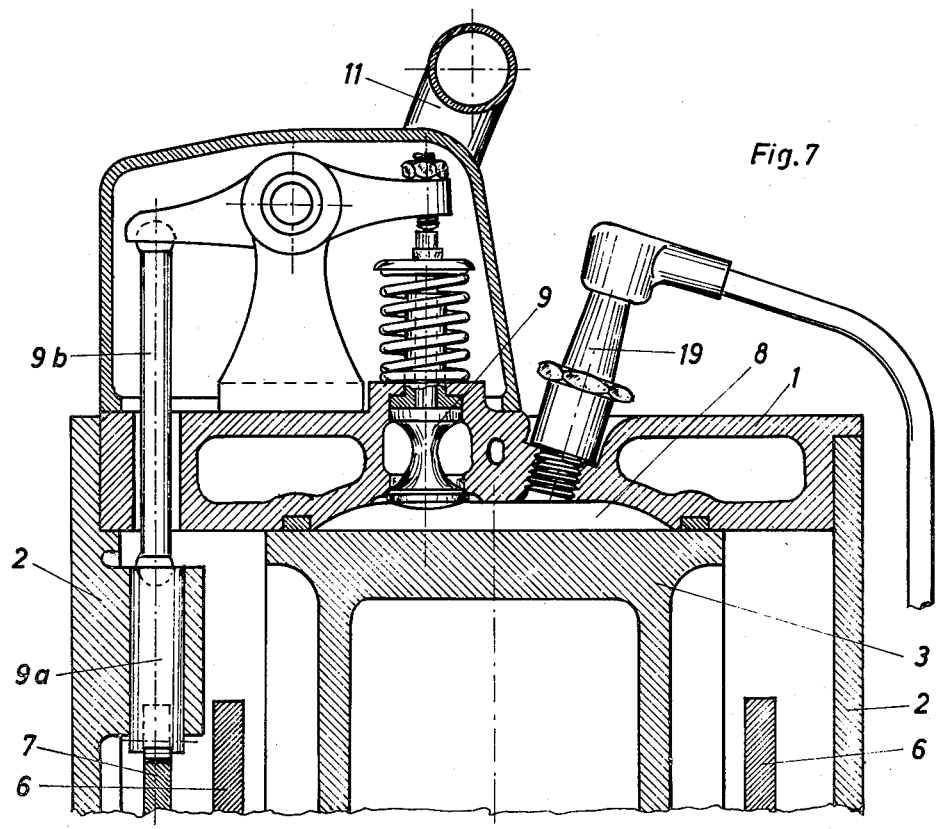
FIGURE 7 is a sectional view indicated by line VII—VII on FIGURE 3 showing the rocker arm which actuates the fuel intake valve and also showing the combustion chamber in cross section and showing the mounting of the spark plug when the engine operates on gasoline.

When the engine requires a spark plug, the spark plug is mounted in communication with the combustion chamber 8 as will be seen in FIGURE 7 and spark is supplied thereto from ignition distributor 18 driven in a conventional manner from shaft 4 as will be seen in FIGURE 4.

It will be evident that the expansion conditions as indicated by a pressure-volume diagram can be controlled by the shaping of the piston cams 5 located at the leading ends of the recesses. As illustrated, there is a compression ratio of about one to seven so that the highest force of the burning mixture on the back side of the piston cams 5 is about 60 kilograms and, after the piston cams have traversed about two-thirds of the expansion chamber, this pressure decreases.

Figure 8:
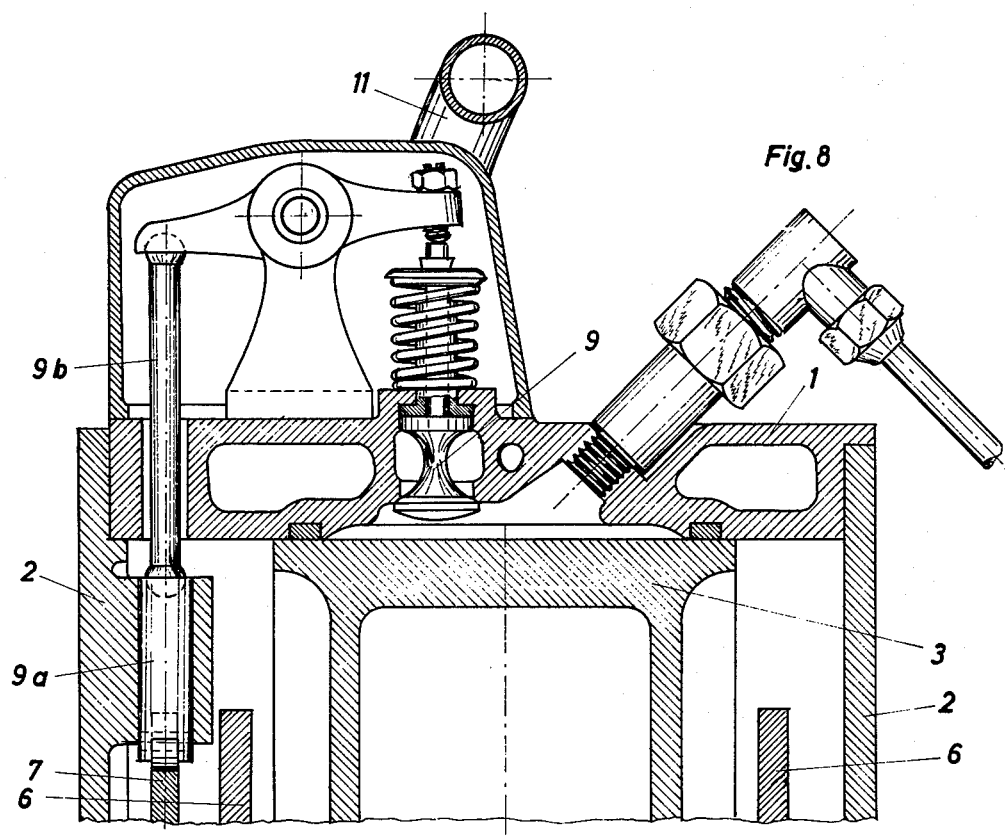
FIGURE 8 is a fragmentary view similar to FIGURE 7, but shows how a fuel injector could be mounted for injecting fuel into a combustion chamber for operation of the engine of a diesel cycle.
Figure 9:
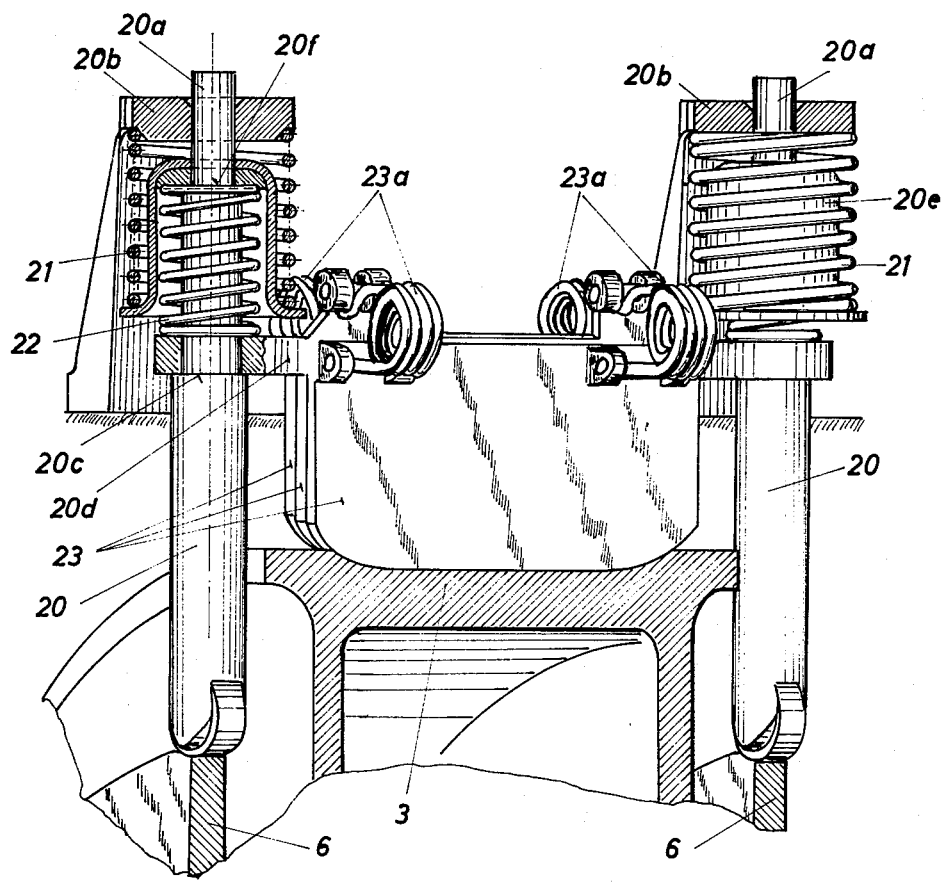
FIGURE 9 is a view showing the construction of the vanes.

FIGURE 8 shows how an injection pump could be supplied to inject fuel into the combustion chamber and it will be understood that this pump could also inject the fuel into transfer passage 11, if so desired.

It is contemplated to lubricate the engine by lubricant introduced into the shaft which will also cool the rotary piston.

The illustrated engine has two combustion chambers and three piston cams and thus has six explosions per revolution of the piston cam.

The housing 1 is provided with a plurality of passages 1a, or these passages could be joined within the housing to form a single passage. Cool fluid is supplied to these passage means as by conduit 1b and is withdrawn therefrom as through conduit 1c thereby providing for a cool engine at all times.

The aforementioned fuel intake valve 9 is arranged to be operated by rocker arm 9a which engages the said valve at one end while, at its other end, it engages push rod means 9b that bears at one extremity on the aforementioned valve actuating cam 7. Valve 9 is normally spring biased to closed position and is opened for a short period by the rises on cam 7a to admit the fuel mixture, or compressed air into combustion chamber 8.

Figure 6:
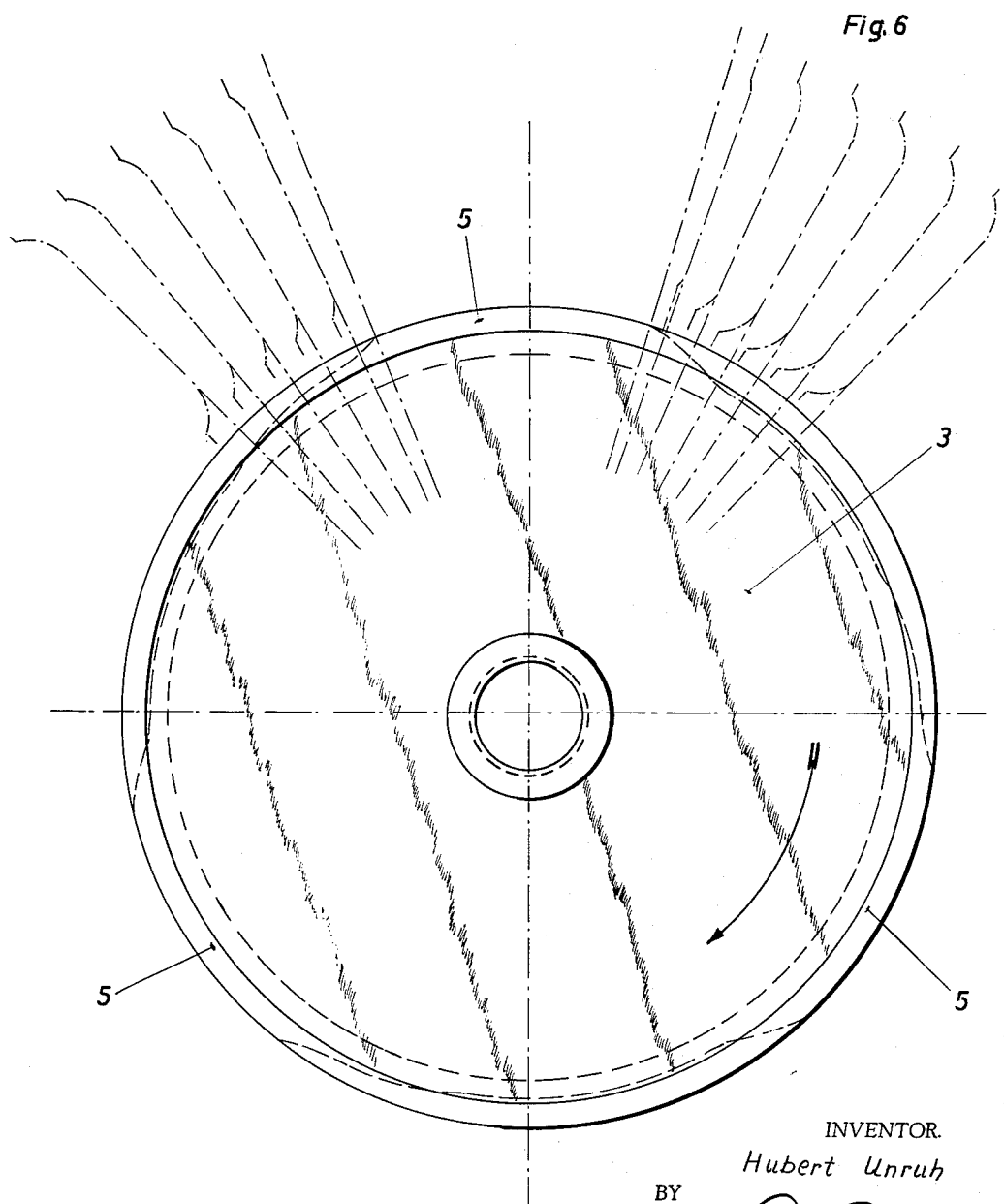
FIGURE 6 is a view showing the rotary piston with various sections therethrough indicated by dot-dash outline showing the development of the surface on which the vanes bear.

It will be noted, particularly in FIGURES 4 and 6, that the lower corners of the vanes are rounded and that the piston valve is rounded to accommodate these rounded corners so that sharp corners on the vanes are eliminated thus eliminating hot spots and thus also provided for sealing between the piston and the vanes even after some wear takes place therebetween.

*Operation with carburetor*

The engine is started, i.e. the rotary piston is turned. The piston cam cast in one piece with the rotary piston 3 pushes the exhaust gases still present in the expansion exhaust space 17 through the exhaust opening 15 to the outside. The piston cam 5 slides on under the sliding vane plates 23 of the blocking vane 14 lifted by the cam discs 6 thereby passing the intake opening 16.

Hereby the piston cam 5 when passing the intake compression space 13 takes in fuel-air mixture on the back side and on the front side compresses the fuel-air mixture already taken in by the preceding piston cam 5 and pushes it through the transfer passage check valve 12 located in front of the combustion chamber sliding vane 10 into the transfer passage 11.

Furthermore, the piston cam 5 slides under the vane plates 23 of the combustion chamber sliding vane 10 lifted by the cam discs 6 and is now in the combustion chamber 8 with the combustion chamber intake valve 9. The combustion chamber intake valve 9 is lifted from its seat for a short period of time by the valve cam disc 7 and allows the compressed fuel-air mixture to enter into combustion chamber 8 whereupon it closes again immediately. Immediately following, ignition occurs by means of spark plug 19. The ignited mixture burns, expands strongly and thereby pushes the piston cam 5 through the expansion exhaust space 17 thereby pressing the exhaust gases of the previous power stroke situated ahead of piston cam 5 through the exhaust opening 15 to the outside.

The blocking vane 14 and the combustion chamber guide vane 10 are built as constant pressure vanes. The push rods 20 by means of the cam disc 6 lift the entire vane construction in accordance with the shape of the sliding surface of the rotary piston 3 and of the piston cams 5 to such an extent that the preloaded vane springs 22 are only able to expand a few millimeters. In this way, the pressure of the vane plates 23 on the rotary piston 3 is always uniform and the wear is small. The vane proper consists of one or several plates and due to its shape is self-sealing. Due to the number of vane plates 23, a labyrinth effect against the sliding surface of the rotary piston 3 is obtained.

*Operation with injection pump*

In this instance, no fuel-air mixture is taken in but fresh air is taken in through the intake opening 16. The injection nozzle injects either directly into the combustion chamber 8 or indirectly into the transfer passage 11.

For a better understanding, the mode of operation has been only described with one piston cam 5. This process takes place also on all other piston cams 5 in a certain time sequence.

It will be understood that this invention is susceptible to modification in order to adapt it to different usages and conditions; and, accordingly, it is desired to comprehend such modifications within this invention as may fall within the scope of the appended claims.

What is claimed is:

1. In a rotary piston engine; a cooled housing having a cylindrical cavity, a piston rotatably mounted in said cavity and having a cylindrical radially outer surface sealingly cooperating with said housing cavity, a shaft fixed to the piston and journaled in the housing, a plurality of uniformly circumferentially spaced, circumferentially extending recesses formed in said outer surface of said piston, said recesses having axial edges located inwardly from the axial edges of the piston and having inclined leading and trailing ends extending from the bottom of said recesses to said outer surface, the adjacent inclined ends of successive recesses at said outer surface being circumferentially separated, said inclined ends forming cams, a plurality of uniformly circumferentially spaced vanes extending axially and radially of said piston and slidably mounted in said housing, said vanes engaging the periphery of said piston and the recesses thereon, said vanes comprising blocking vanes and combustion chamber vanes in alternating relation and in number exceeding by at least one the number of said recesses, an inlet adjacent each blocking vane in the direction of piston rotation, a combustion chamber adjacent of each combustion chamber vane in the direction of piston rotation and conduit means forming a transfer passage leading from immediately adjacent each combustion chamber vane on the side opposite the combustion chamber to said combustion chamber located immediately adjacent the said combustion chamber vane, an outlet for exhaust gas adjacent each blocking vane on the side opposite the inlet, whereby as the piston rotates gas is drawn into the housing behind each blocking vane while simultaneously gas is compressed adjacent the next combustion chamber vane and into a transfer passage and means for maintaining substantially constant pressure of the vanes on the piston, said last mentioned means comprising resilient means biasing the vanes toward the piston, cams carried with the piston and rotating therewith, and also comprising means operatively connecting the cams with the resilient means to adjust the force exerted by said resilient means as the vanes move radially of the piston, the axial edges of said recesses being rounded, each said vane having rounded axial corners for engaging the rounded axial edges of said recesses and the radius of said rounded corners and edges being greater than the greatest radial depth of said recesses.

2. The arrangement according to claim 1, wherein each of said vanes comprises a plurality of individual relatively slideable plates in face to face engagement, and means resiliently interconnecting said plates so that the plates can slide radially on each other whereby the vanes will conform to the contour of the piston.

3. The arrangement according to claim 2, wherein the incline on the leading end of each recess and which forms the trailing side of the preceding cam is shaped in conformity with the pressure-volume diagram to control the force exerted on each cam in the combustion chamber.

4. The arrangement according to claim 1, in which ignition means is provided in the region of each said combustion chamber.

References Cited by the Examiner

UNITED STATES PATENTS

| 885,006 | 4/1908 | Barnes | 123—14 |
| 947,430 | 1/1910 | Jagersberger et al. | 123—14 |
| 955,288 | 4/1910 | Schroeder | 123—14 |
| 1,138,566 | 5/1915 | Horn | 123—14 |
| 1,145,627 | 7/1915 | Stradovsky | 123—14 |
| 1,319,932 | 10/1919 | Stevenson | 123—14 |
| 1,575,860 | 3/1926 | Monk | 123—14 |
| 2,091,120 | 8/1937 | Kinney | 123—14 |
| 2,158,532 | 5/1939 | Bullen | 123—8 |
| 2,690,166 | 9/1954 | Shore | 123—14 |

FOREIGN PATENTS 544,067  3/1942  Great Britain.

SAMUEL LEVINE, *Primary Examiner.*

JOSEPH H. BRANSON, JR., KARL J. ALBRECHT,
*Examiners.*